Patented May 1, 1951

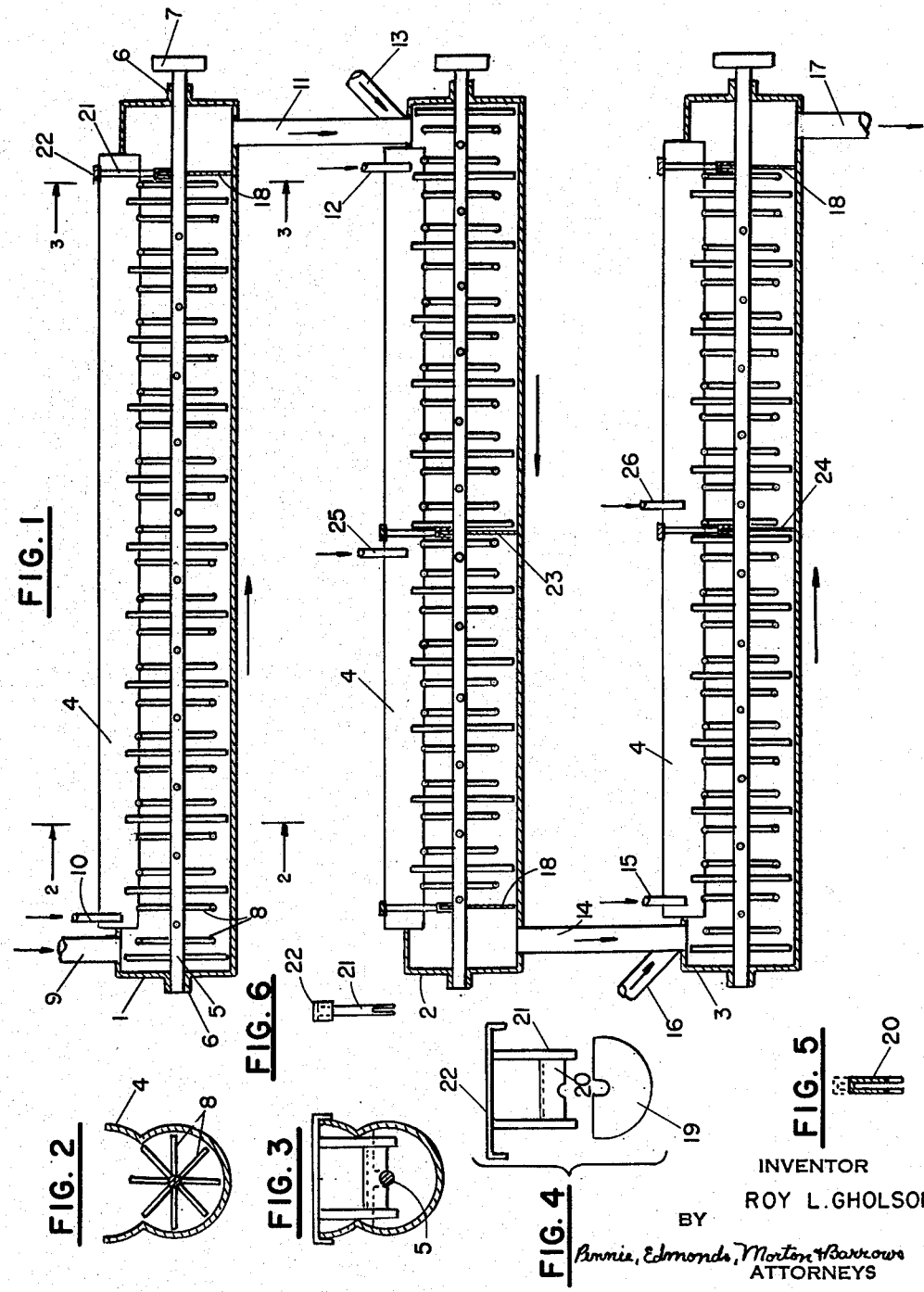

2,550,802

UNITED STATES PATENT OFFICE 2,550,802

CARBON BLACK

Roy L. Gholson, Fairbanks, La., assignor to Columbian Carbon Company

Application October 15, 1947, Serial No. 779,861

4 Claims. (Cl. 23—314)

This invention relates to improvements in the conversion of loose carbon black to the pelleted or beaded form and provides an improved process whereby loose, flocculent furnace carbons may be converted to a beaded, substantially dustless product having sufficient strength to permit bulk handling and yet sufficiently friable to permit ready dispersion in rubber, or the like.

Carbon blacks, as initially produced, are extremely light, finely divided, bulky materials, which readily fly into the atmosphere. There are two principal types of carbon black, namely, the so-called channel or impingement blacks, and the so-called furnace blacks.

Known means have been developed for forming free-flowing beads or pellets of channel black of sufficient strength to withstand shipment in large masses, for instance, in tank car lots, handling by mechanical or other conveyors and storage in large bins with gravity or other type of feed to the point of use. The pelleting or beading of channel black has been developed to a point where it is now common practice to produce so-called dustless channel black in beads or pellets having the requisite strength for handling in bulk without undue disintegration of the pellets or loss of their free-flowing characteristics, which is necessary for bulk handling.

The use of furnace blacks by the industry is rapidly becoming more general and it is highly desirable to handle blacks of this type in bulk, as has been done with the channel blacks. However, processes successful for the conversion of the flocculent channel black to the pelleted form have not resulted in satisfactory pelleted products when applied to the furnace blacks. The furnace blacks are commonly converted to a pelleted form, by processes which have been successfully applied to channel blacks, to increase their apparent density and to improve their handling characteristics. But, because of the weakness of the pellet structure produced by the application of such processes to furnace blacks, the resultant pellets of the furnace black cannot be handled by the bulk systems now in use without serious disintegration and loss of their free-flowing characteristics.

The present invention provides an improved process for the conversion of flocculent furnace blacks to the pelleted form which results in a beaded, free-flowing furnace black having the necessary strength to permit handling in bulk. The pelleted product thus produced has the advantages of dustlessness and capacity for handling and shipping in bulk, characteristic of the pelleted channel blacks commonly produced.

As distinguished from impingement blacks, the blacks herein designated furnace blacks, are generally made by burning hydrocarbons in a chamber or furnace with an amount of air insufficient for complete combustion and separating the resultant carbon black from the furnace effluent gases. This general classification also includes blacks formed by thermally decomposing hydrocarbons by admixing them with hot gases, or passing them in contact with highly heated surfaces. The designation, "furnace blacks," as used herein, and in the accompanying claims, is intended to include all blacks of the type produced by such furnace methods, not excluding the so-called lamp blacks.

As previously noted, it has been known that the furnace blacks may be readily formed into beads, or pellets, by agitation with a relatively small amount of water, for instance, an amount of water up to, or somewhat exceeding in weight the weight of the furnace black. However, the resultant furnace black beads are fragile and lack sufficient strength to withstand bulk handling. The optimum proportion of water to be used in forming such pellets varies somewhat with the characteristics of the particular furnace black used but may be readily determined by simple test, as understood by the art. Further, the optimum amount of water to be used with any particular black will depend somewhat upon the type of stirring mechanism used and the vigor with which the black is stirred.

For instance, a more finely divided black will generally require relatively larger amounts of water. Generally, the more dense the black, the less water required. A more dense, small particle size furnace black may require approximately the same amount of water as a less dense, but coarser particle size black. Also, the amount of water added is somewhat influenced by the oil content of the black, a black of higher oil content usually requiring a larger amount of water than one of smaller oil content.

In accordance with my present invention, the furnace black is preliminarily subjected to agitation with an amount of water sufficient to form the particular black into pellets and the agitation is continued until fragile pellets, characteristic of such treatment of furnace blacks, are formed. I have found, however, that if additional unpelleted, dry furnace black be added to the pellets thus formed and the agitation continued, the initially formed pellets may be disintegrated, and that if additional water is then added in an amount sufficient to effect the pelleting of the entire carbon black present and the agitation continued, the composite mass of furnace black is again formed into beads, or pellets, but having substantially increased strength.

I have further found that, by repeating this procedure, furnace black pellets of adequate strength to withstand bulk handling may be formed. The procedure of forming the carbon black pellets by agitation with the water, and the subsequent disintegration of the pellets by agitating with additional dry furnace black must be repeated at least twice before furnace black pellets of adequate strength to withstand bulk handling are formed. These steps may be repeated a greater number of times, but I have found that three such pelleting operations, with intervening disruption by agitating with the additional furnace black, are usually sufficient for the purposes of the present process and that no marked advantage is normally attained by further repetition.

Predicated thereon, my present invention comprises a multi-stage process comprising the following steps:

1. A furnace carbon black is agitated with an amount of water sufficient to form the black into pellets until the black has been substantially reduced to pelleted form.

2. Further dry furnace black is added and the agitation continued. In the process of mixing in this dry black by continued agitation the previously formed pellets are disintegrated.

3. A second increment of water is added, sufficient to form the composite black mixture into pellets, and the agitation continued until pellets are reformed.

4. Further dry furnace black is added and the agitation continued until the last formed pellets have been disintegrated.

5. A third increment of water, sufficient to form the composite mixture into pellets, is added and the agitation continued until substantially all of the black has been converted to pellets or beads.

As previously noted, this procedure of forming the black into pellets with the subsequent disintegration of the pellets may be further repeated, but normally the three stage pelleting operation just described is adequate.

Satisfactory results are generally more easily obtained where the black is somewhat densed, as by mechanical agitation or the like, prior to subjection to the present process. For example, the black may be deaerated by conventional means as a preliminary step to my present process. This is usually desirable, though not essential.

It has previously been proposed in connection with the pelleting of carbon black, to agitate the black with an amount of water sufficient to form a paste, or wet plastic mass. In accordance with my present process, a lesser amount of water is normally used. In my three stage operation, just described, I have found it particularly advantageous to add the carbon black in three substantially equal increments and further to add the water in three substantially equal increments. As previously noted, the total amount of water will vary somewhat with the particular furnace black being processed. For example, with certain furnace blacks, the optimum total amount of water used has been found to be about 50% by weight of the carbon black, but the optimum proportions of water will be dependent on the characteristics of the particular furnace black being processed. After the final pelleting operation, the resultant pellets may be dried in the conventional manner, for instance, by heating in an oven, to drive off water.

My improved beading process will be further described and illustrated with reference to the accompanying drawings which represent conventionally and somewhat diagrammatically a small laboratory scale apparatus which has been successfully used in the carrying out of my process. It will be understood, however, that the process is not restricted with respect to the particular apparatus employed but may be carried out in other known apparatus adapted to the thorough agitation of the materials.

Figure 1 of the drawing is a vertical sectional view of the apparatus;

Figure 2 is a vertical transverse section along lines 2—2 of Figure 1;

Figure 3 is a vertical transverse section along lines 3—3 of Figure 1, and shows in particular the arrangement of an adjustable weir assembly;

Figure 4 is a further detailed view of the elements of the weir assembly;

Figure 5 is a transverse sectional view of the upper adjustable weir-extension plate; and Figure 6 is an end view of the weir support.

The apparatus illustrated in the drawing comprises three substantially horizontal agitating chambers indicated on the drawing by the reference numerals 1, 2, and 3, and herein sometimes referred to as flights 1, 2, and 3. Instead of the three separate chambers, a single long chamber may be used.

Each of the flights 1, 2, and 3 comprises a substantially horizontal cylindrical chamber made from 4 inches O. D. steel boiler tubing and 29 inches in length. The flights are open on their upper sides and provided with upwardly extending flanges 4 formed by cutting the tubing along one side and turning back 1½ inches of the metal along each side of the cut, as more clearly appears from Figure 2 of the drawings. It is frequently desirable, especially in large scale operation, to provide a cover for these openings along the upper sides of the respective chambers, or the openings may be omitted.

Rotatably supported in each chamber is a shaft 5, supported by bearers 6 and adapted to be driven by pulleys 7. These shafts are ⅝ inch in diameter. Extending through the shafts, and spaced apart ⅝ of an inch, are a plurality of $\frac{3}{16}$ inch pins 8. These pins are 3 inches long and extend an equal distance from each side of the shaft. Each pin is positioned at an angle of 45° from the pin on either side thereof so as to form a double spiral extending substantially the length of the chamber, each spiral having three complete flights over the length of the shaft.

The top chamber is provided at the extreme left with an inlet conduit 9 adapted to the introduction of dry furnace black in regulated amounts. Just to the right of conduit 9 is a water feed line 10. Extending downwardly from the extreme right of the chamber 1 is a downcomer 11 connecting the top chamber 1 with the intermediate chamber 2. Just to the left of the downcomer 11 is a water feed line 12. The right end of the chamber 2 is also connected with a conduit 13 adapted to the introduction of additional dry furnace black in regulated amounts to the chamber. Extending downwardly from the extreme left end of chamber 2 and connecting that chamber with the lower chamber 3 is downcomer 14 just to the right of which is a water feed line 15. Chamber 3 is also connected with conduit 16 for the introduction of additional dry furnace black in regulated amounts. The right hand end of chamber 3 is connected with conduit 17 leading to a drier, or the like not shown.

Each of the chambers is also provided with one or more weirs 18 shown in Figure 1 of the drawings just ahead of the downcomers 11, 14, and 17, respectively. Additional weirs, such as indicated at 18, may be positioned at different points in the respective chambers, as subsequently herein described.

In the operation of my process in the apparatus shown in the drawings, carbon black, advantageously predensed, is continuously introduced at a regulated rate into the upper chamber through inlet conduit 9. Water is introduced at a regulated rate through inlet 10 and the black and water are agitated by means of the pins on the rotating shaft and the composite black and water caused to move through the chamber by reason of the spiral arrangement of the pins. The weir 18 in chamber 1 is adapted to maintain the desired charge of carbon black in the chamber, the carbon black over-flowing past the weir and gravitating into the next lower chamber through the downcomer 11. Additional carbon black is added at a regulated rate to chamber 2 through the conduit 13 and additional water also at a regulated rate is added through the connection 12. The black is similarly carried through the chamber 2, over weir 18, and gravitates through downcomer 14 into the lower chambers 3. Additional dry carbon black is introduced to chamber 3 through the conduit 16 and additional water is added through connection 15. The black is carried by the spirally arranged pins through chamber 3, flows over the weir 18 and passes from the chamber through conduit 17, for instance, to a drier of conventional type, not shown, but adapted to remove water from the pelleted carbon black. While only three flights of agitation are shown in the drawing, it will be understood that a greater number of flights may be used where desirable.

The arrangement and construction of the weirs 18 are particularly shown in Figures 3, 4, 5, and 6 of the drawings. They include a lower semicircular disc 19 notched at the middle of its upper edge as shown to fit substantially vertically beneath the shaft 5 so as to form an obstruction across the lower portion of the chamber. An upper member 20 is designed, as shown, in Figure 5 so as to fit over the upper edge of the disc 19 and is supported by posts 21, extending downwardly from bracket 22, the bracket being designed to rest upon and be supported by the upper edges of the flanges 4. The lower ends of posts 21 are bifurcated to fit over the upper edges of the disc 19 so as to support the upper portion of the disc and hold it in place. The bracket 22 is removably fastened to flanges 4, by means not shown. The height of the weir is adjustable by the use of interchangeable plates 20 of various heights as indicated by dotted lines in Figure 5.

Particularly advantageous results have been obtained in apparatus such as described by adding the carbon black to the process in three substantially equal increments through the conduits 9, 13, and 16, respectively, and adding the water in three equal increments through water inlets 10, 12 and 15, respectively. The maximum capacity of the apparatus specifically described is about 25 pounds of carbon black per hour. The agitation shafts are, with advantage, adapted to be operated at variable speeds. The water inlets are equipped with spray tips of known type, not shown, adapted to operate at a pressure of from 25 to 125 pounds per square inch pressure.

In a particularly advantageous modification of the apparatus and process just described, additional weirs 23 and 24, of the type described, are provided at about the central portion of chambers 2 and 3, respectively, so as to divide those chambers into two sections. In this method of operation, the water is introduced to the respective chambers through connections 25 and 26 instead of through connections 12 and 15, as previously described. With this arrangement, the upstream half of the respective chambers 2 and 3 serves as disintegrating chambers wherein the preformed pellets are broken up by agitation with the added dry furnace black prior to the addition of further water. Under such conditions of operation, a more thorough disintegration of the preformed pellets is usually more readily accomplished with resultant improved characteristics of the finished pellets.

It is not essential that the disintegrating and the beading sections of the respective flights be of equal length. Considerable variation in this respect is permissible, the optimum conditions being influenced by the characteristics of the particular black being processed and the proportions of water used.

The proportion of the total water added at the various points in the process is also subject to considerable variation. The water may be added in substantially equal amounts, the optimum amount of total water, as previously described, depending in large measure upon the characteristics of the particular furnace black being processed. The optimum proportions of water added at the respective points is likewise largely dependent upon the characteristics of the black, including its oil content, its fineness of subdivision, its structure characteristics and the extent to which the black has been predensed.

The optimum rate of feeding the black to the apparatus has also been found to vary somewhat with the characteristics of the particular black and is readily determined by simple tests. By the used of weirs so constructed, as previously described, that their height is adjustable, the retention of a greater or less amount of the black in the respective chambers, or sections, of the chambers of the apparatus is readily effected.

Also, by varying the rate and location of the water additions, the size of the pellets may be varied at will over a considerable range.

My process is applicable to continuous operation in apparatus such as just described, or may be carried out as a batch operation, the several steps being carried out successively in the same agitating chamber. The process is however particularly adapted to continuous operation whereby the several increments of furnace black and water, respectively, are continuously added to the respective agitating zones and the finished beads are continuously withdrawn from the final zone.

The furnace black pellets formed by my process are generally spherical, non-adhering, relatively hard beads having well polished surfaces. Particularly advantageous results have been attained where the total amount of water added is about 50% of the summation of the weights of the furnace black increments.

Various methods have been devised for evaluating the bulk handling characteristics of carbon black beads, including the resistance of a single bead to crushing, mass compressibility of the beads, the resistance of the beads to bridging in flowing under pressure from a large container through a conduit of reduced size leading from the lower end thereof, approximating conditions in a gravity feed storage bin, and the density of the pelleted black.

The crushing characteristic of the beads is determined by placing a single bead of predetermined size on a glass microscope slide supported by one arm of an analytical balance with a second, weighted slide supported by the floor of the balance above the first slide in a plane parallel to and spaced from the plane of the first slide a distance just equal to the diameter of the bead. The other pan of the balance is then weighted by the gradual addition of measured quantities of water from a burette to a flask on the pan until sufficient weight has been added to crush the bead. This weight is then recorded in grams. Good comparative results have thus been attained by selecting well-rounded beads of equal diameters, say, 0.6 mm.

The mass compressibility of the beads is determined by using an apparatus consisting of a ¾ inch I. D. glass tube, a pair of brass plungers with platform bases and a series of weights, the plungers being of such diameter as to form a loose sliding fit within the glass tube. In carrying out the test, one of the plungers is inserted in the lower end of the tube, a 5 gram sample of the beads to be tested is placed in the tube and the tube is gently tapped while in a vertical position until the column of beads in the tube has come to a constant height. The second plunger is then placed in the upper end of the tube resting on the column of beads and gradually weighed, until a total weight of 25,000 grams has been applied, the height of the bead column being measured and recorded before and after the weight is applied. From these figures, percentage mass compressibility may be calculated from the formula:

$$\left(\frac{H}{H'}-1\right)\times 100$$

where H is the height of the column of beads before compression and H' is the height of the column of beads after compression. The results of this test have been found to be a dependable indication of the ability of the beads to retain their free-flowing characteristics under pressures such as those to which the beads are subjected in bulk handling.

The bead density is determined by weighing 100 cc. of the beads and is expressed in pounds per cubic foot.

The process will be further described and its utility illustrated by the following specific examples of its application to the beading of different furnace blacks in the previously described apparatus. In each instance, the ratio of total water to total black used was 1:2 by weight, the black being charged in equal increments to the apparatus through conduits 9, 13, and 16 and the water being charged in equal increments at the upstream end of flight 1 and at intermediate points of flights 2 and 3, respectively. Also, in each instance, the flights were operated at 230 R. P. M.

EXAMPLE I

A dry furnace black of low oil content (about 0.07%) was continuously charged to the apparatus at a rate totalling 5 pounds per hour.

EXAMPLE II

A dry furnace black of relatively high oil content (about 1.7%) was charged to the apparatus at a total rate of 5 pounds per hour.

EXAMPLE III

A dry furnace black of a type similar to that used in Example II was charged to the apparatus at a total rate of 5 pounds per hour.

EXAMPLE IV

A dry furnace black similar to that used in Example II was charged to the apparatus at a total rate of 7–8 pounds per hour.

In each instance, the beads passing from flight 1 were quite fragile and large and were easily disintegrated by the agitation with the additional dry black in the first section of flight 2. The beads formed in the latter half of flight 2 and passing from flight 2 were likewise too fragile for bulk handling and were disintegrated in the first section of flight 3. However, the beads passing from flight 3 were well-rounded and polished and of adequate strength for bulk handling.

The mass compressibility of the unscreened beads, their density in pounds per cubic foot and the crushing strength of a 0.6 mm. bead are set forth in Table I, and the screen analysis of the beaded products of the foregoing examples are set forth in the following Table II.

*Table I*

| Sample from Example | Mass Compressibility | Density | Crushing Strength |
|---|---|---|---|
| | Per cent | Lbs. per cu. ft. | Grs. |
| I | 22.5 | 37.2 | 9.0 |
| II | 19.5 | 38.1 | 10.6 |
| III | 19.5 | 39.5 | 11.1 |
| IV | 24.0 | 35 | 7.8 |

*Table II*

| Sample from Example | Screen Analysis Per Cent on Mesh | | | | |
|---|---|---|---|---|---|
| | 20 | 40 | 60 | 80 | 100 |
| I | 47.9 | 41.3 | 8.6 | 1.5 | 0.3 |
| II | 44.1 | 43.5 | 9.3 | 2.2 | 0.4 |
| III | 47.5 | | 50.5 | | 1.8 |
| IV | 62.3 | 31.2 | 4.9 | 1.1 | 0.2 |

The foregoing test results indicate that the beads from each of the foregoing specific examples were of sufficient strength to permit their handling in bulk while capable of ready disruption and dispersion in the milling of rubber, for instance.

I claim:

1. A process for forming finely divided furnace blacks into beads adapted to bulk handling which comprises continuously passing an increment of the black and an increment of water to an agitating zone in proportions such as will form the carbon black into beads upon agitation and agitating the mixture therein until it has been substantially completely formed into beads, continuously passing the resultant beads from the agitating zone, adding a second increment of the black thereto and agitating the mixture in a second agitating zone until the beads have become disintegrated, adding a second increment of water in an amount sufficient to form the composite black mixture into beads and agitating the mixture until it has been substantially completely formed into beads, continuously passing the resultant beads from the second agitating zone, adding a third increment of the black to the beads and agitating the beads in a third agitating zone until the last formed beads have been disintegrated, adding a third increment of water in an amount sufficient to form the composite black mixture into beads and continuing the agitation until it has been substantially completely formed into beads and continuously passing the resultant beads from the third agitating zone.

2. A process for forming furnace blacks into beads adapted to bulk handling which comprises agitating the black with an amount of water sufficient to form the black into beads until the black has been substantially completely reduced to bead form, adding to and mixing with the beads thus formed a further increment of flocculent furnace black and agitating the mixture to disintegrate the beads, adding a further increment of water to the resultant furnace black mixture in an amount sufficient to form the composite black mixture into beads and agitating the mixture until it has been substantially completely formed into beads, adding to and mixing with the beads thus formed a further increment of flocculent furnace black and agitating the mixture to disintegrate the beads, adding a third increment of water to the resultant furnace black mixture in an amount sufficient to form the composite black mixture into beads and agitating the mixture until beads are formed.

3. The process of claim 2 in which the water and black, respectively, are added in three equal increments.

4. The process of claim 2 in which the ratio of total water to total black is 1:2 by weight.

ROY L. GHOLSON.

REFERENCES CITED

The following references are of record in the file of this patent:

UNITED STATES PATENTS

| Number | Name | Date |
| --- | --- | --- |
| 2,131,686 | Heller et al. | Sept. 27, 1938 |
| 2,213,056 | Skoog et al. | Aug. 27, 1940 |
| 2,228,704 | Offutt | Jan. 14, 1941 |